(12) United States Patent
Stotzer et al.

(10) Patent No.: US 9,398,448 B2
(45) Date of Patent: Jul. 19, 2016

(54) ENHANCED WIRELESS COMMUNICATION SECURITY

(71) Applicant: Intel Corporation, Santa Clara, CA (US)

(72) Inventors: Reinhard Stotzer, Albuquerque, NM (US); Kenneth Reese, Portland, OR (US); Raviprakash Nagaraj, Tigard, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/715,611

(22) Filed: Dec. 14, 2012

(65) Prior Publication Data

US 2014/0169560 A1  Jun. 19, 2014

(51) Int. Cl.
*H04L 29/06* (2006.01)
*H04W 12/02* (2009.01)
(Continued)

(52) U.S. Cl.
CPC .............. *H04W 12/02* (2013.01); *H04W 12/04* (2013.01); *H04W 12/06* (2013.01); *H04W 12/08* (2013.01); *H04W 12/12* (2013.01); *H04W 84/18* (2013.01)

(58) Field of Classification Search
CPC ........... H04L 9/06; H04L 9/65; H04L 9/0825; G06F 21/35; G06F 21/43; G06F 21/445; H04W 12/02; H04W 12/04; H04W 12/06; H04W 12/08
USPC .......... 713/156, 159, 168, 179; 380/270, 247, 380/248, 249; 726/2–3, 6, 26–29
See application file for complete search history.

(56) References Cited

U.S. PATENT DOCUMENTS 5,457,748 A * 10/1995 Bergum .................. G06F 21/86
                                                        380/270
6,097,817 A *  8/2000 Bilgic et al. ................... 380/270
(Continued)

FOREIGN PATENT DOCUMENTS

WO  WO 2010/108513   9/2010
WO  WO 2012/167352  12/2012

OTHER PUBLICATIONS

International Search Report and Written Opinion, PCT/ISA/210, PCT/ISA/220, and PCT/ISA/237, mail date Aug. 28, 2013, total of 9 pages.
(Continued)

*Primary Examiner* — Hadi Armouche
*Assistant Examiner* — Sher A Khan
(74) *Attorney, Agent, or Firm* — Pillsbury Winthrop Shaw Pittman LLP

(57) ABSTRACT

Systems, methods, and devices are directed to an electronic device that includes a first wireless communication module configured to facilitate transmission and reception of data via a wireless communication link and a first secure element while a wireless communication device includes a processor, an operating system executed by the processor, a second wireless communication module configured to facilitate transmission and reception of data via the wireless communication link, and a second secure element. The second secure element exchanges information with the first secure element via the wireless communication link to establish a secure channel within the wireless communication link, and the wireless communication device employs logic configured to route the data to the second secure element for processing prior to forwarding the data to the operating system, upon establishing the secure channel.

14 Claims, 2 Drawing Sheets

(51) Int. Cl.
*H04W 12/08* (2009.01)
*H04W 12/06* (2009.01)
*H04W 12/04* (2009.01)
H04W 12/12 (2009.01)
H04W 84/18 (2009.01)

(56) References Cited

U.S. PATENT DOCUMENTS

| | | | | |
|---|---|---|---|---|
| 7,552,322 | B2* | 6/2009 | Balfanz et al. | 713/159 |
| 8,014,720 | B2* | 9/2011 | Lortz | G06F 8/61 |
| | | | | 455/41.1 |
| 8,559,987 | B1* | 10/2013 | Fisher | 455/466 |
| 8,601,498 | B2* | 12/2013 | Laurich | G06F 21/602 |
| | | | | 711/114 |
| 8,712,407 | B1* | 4/2014 | Cope | H04W 4/00 |
| | | | | 455/41.1 |
| 9,154,903 | B2* | 10/2015 | Adams | H04W 4/008 |
| 2003/0041244 | A1* | 2/2003 | Buttyan | G06Q 20/20 |
| | | | | 713/172 |
| 2005/0254645 | A1* | 11/2005 | Shippy | G06F 21/606 |
| | | | | 380/28 |
| 2006/0085848 | A1* | 4/2006 | Aissi et al. | 726/9 |
| 2007/0297609 | A1 | 12/2007 | Adams et al. | |
| 2008/0133929 | A1* | 6/2008 | Gehrmann et al. | 713/179 |
| 2008/0155257 | A1* | 6/2008 | Werner et al. | 713/168 |
| 2009/0132813 | A1* | 5/2009 | Schibuk | 713/158 |
| 2011/0305340 | A1* | 12/2011 | Eisenbach | 380/270 |
| 2012/0072718 | A1* | 3/2012 | Ronda et al. | 713/156 |
| 2012/0079282 | A1* | 3/2012 | Lowenstein | G06F 21/83 |
| | | | | 713/189 |
| 2012/0084438 | A1* | 4/2012 | Raleigh | H04L 41/046 |
| | | | | 709/224 |
| 2012/0136786 | A1 | 5/2012 | Romagnoli et al. | |
| 2012/0177199 | A1* | 7/2012 | Baek et al. | 380/270 |
| 2013/0040566 | A1* | 2/2013 | Mourtel | G06K 7/0008 |
| | | | | 455/41.1 |
| 2013/0143489 | A1* | 6/2013 | Morris | H04B 5/0056 |
| | | | | 455/41.1 |
| 2013/0159710 | A1* | 6/2013 | Khan | 713/168 |
| 2013/0273889 | A1* | 10/2013 | Lobmaier | H04W 12/08 |
| | | | | 455/411 |
| 2013/0331029 | A1* | 12/2013 | Tang | H04W 4/003 |
| | | | | 455/41.1 |
| 2014/0013406 | A1* | 1/2014 | Tremlet | G06F 21/32 |
| | | | | 726/5 |
| 2014/0169560 | A1* | 6/2014 | Stotzer | H04W 12/02 |
| | | | | 380/270 |

OTHER PUBLICATIONS

Matthieu Bloch et al., Wireless Information-Theoretic Security, IEEE Transactions on Information Theory, vol. 54, No. 6, Jun. 2008, pp. 2515-2533.

Hongmei Deng et al., Routing Security in Wireless Ad Hoc Networks, Telecommunications Network Security, IEEE Communications Magazine, Oct. 2002, pp. 70-75.

International Preliminary Report on Patentability mailed Jun. 25, 2015 for corresponding International Patent Application No. PCT/US2013/047117 (8 pages).

European Extended Search Report mailed Jun. 15, 2016 for corresponding European Patent Application No. 13862799.7 (9 pages).

Francis, Leshoy et al., "A Security Framework Model with Communication Protocol Translator Interface for Enhancing NFC Transactions", Telecommunications (AICT), 2010 Sixth Advanced International Conference on, IEEE, May 9, 2010, pp. 452-461.

* cited by examiner

ENHANCED WIRELESS COMMUNICATION SECURITY

TECHNICAL FIELD

This disclosure relates generally to the field of wireless communications.

BACKGROUND ART

The ability to have consumer electronic devices wirelessly communicate with each other has gained increased popularity due to the convenience, ease of use, flexibility, and low-power attributes it provides to consumers. One particularly popular attribute, is the capability for wireless-enabled consumer devices to communicate with cellular-based telephones (e.g., smartphones) or other communication devices. As a result, wireless communications based on technologies, such as, for example, BlueTooth, Wi-Fi, Near Field Communications (NFC), etc. are increasingly incorporated in a wide array of consumer electronic devices.

In some cases, however, wireless communications, such as BlueTooth, occurring between a wireless-enabled device and a smartphone (or the like) are routed directly through the operating system of the smartphone, thereby making smartphones vulnerable to malware attacks, phishing, and sniffing. While there has been an effort to provide encryption modules that provide some protection from such attacks, these modules may be suboptimal as they are extrinsic to the smartphones and do not exploit the hardware and software architectural features of smartphones that may be configured to provide enhanced security.

DETAILED DESCRIPTION

Figure 1:
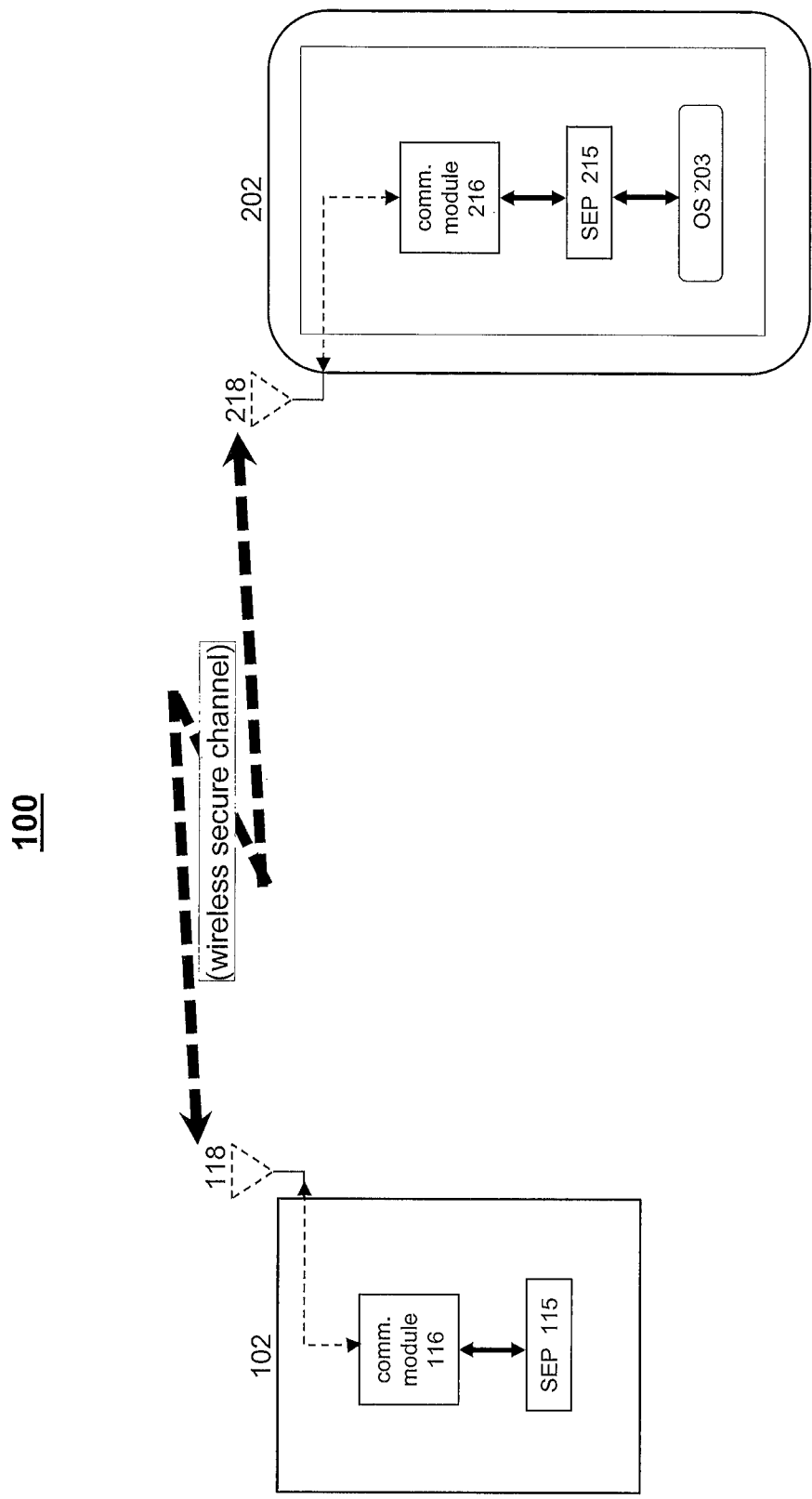
FIG. 1 depicts a high-level functional block diagram of a secure wireless communication system employing a wireless-enabled device and a wireless communication device, in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless communication device and system for conducting secure communications. That is, the embodiments relate to an electronic device that includes a first wireless communication module configured to facilitate transmission and reception of data via a wireless communication link and a first secure element while a wireless communication device includes a processor, an operating system executed by the processor, a second wireless communication module configured to facilitate transmission and reception of data via the wireless communication link, and a second secure element. The second secure element exchanges information with the first secure element via the wireless communication link to establish a secure channel within the wireless communication link, and the wireless communication device employs logic configured to route the data to the second secure element for processing prior to forwarding the data to the operating system, upon establishing the secure channel.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

FIG. 1 depicts a high-level functional block diagram of a secure wireless communication system 100 employing wireless-enabled device 102 and wireless communication device 202, in accordance with various aspects of the present disclosure. The wireless communications between wireless-enabled device 102 and wireless communication device 202, via RF antennas 118, 218, respectively, may operate under a variety of wireless communication protocols and standards, such as, for example, Wi-Fi, WiMax, WWAN, WLAN, WPAN, BlueTooth, BlueTooth Low Energy, or any other implementation of a suitable wireless standard.

It is to be noted that, while the wireless communications between wireless-enabled device 102 and wireless communication device 202 is not limited to any specific standard and the examples discussed may be implemented separately or in combination with each other, for the sake of tractability and clarity, the embodiments described heretofore will be directed to BlueTooth-based communications.

In the embodiment depicted in FIG. 1, wireless-enabled device 102 may comprise any consumer electronic device that is capable of performing wireless BlueTooth communications. As such, wireless-enabled device 102 may take a variety of forms, such as, for example, cameras, printers, copiers, audio and video equipment, locking mechanisms, desktops, laptops, mobile devices, smart phones, gaming devices, tablet computers, navigation devices, wireless-enabled patient monitoring devices, and any other consumer electronic device. As indicated in the non-limiting embodiment of FIG. 1, wireless-enabled device 102 includes BT communication module 116 (i.e., BlueTooth communication chipset) and secure element platform (SEP) 115 which will be described in detail below.

On the other hand, wireless communication device 202 is a device that is also capable of performing BlueTooth communications but may be primarily designed for conducting wireless communications under various standards and protocols, such as, for example, CDMA, GPRS, 3G or 4G, LTE, etc. In so doing, wireless communication device 202 may comprise, for example, a cellular/smart phone, laptop, mobile device, tablet computer, personal communication system (PCS) device, personal digital assistant (PDA), personal audio device (PAD), etc.

As noted above, wireless communication device 202 is capable of performing BlueTooth communications and therefore includes BT communication module 216 (i.e., BlueTooth communication chipset) and secure element platform (SEP) 215 which will be described in detail below. In addition, wireless communication device 202 incorporates an operating system (OS) to manage the software applications as well as the hardware devices and resources, including the operation of peripheral components, such as, keypads, screens, address books, phone dialers, batteries, etc.

Figure 2:
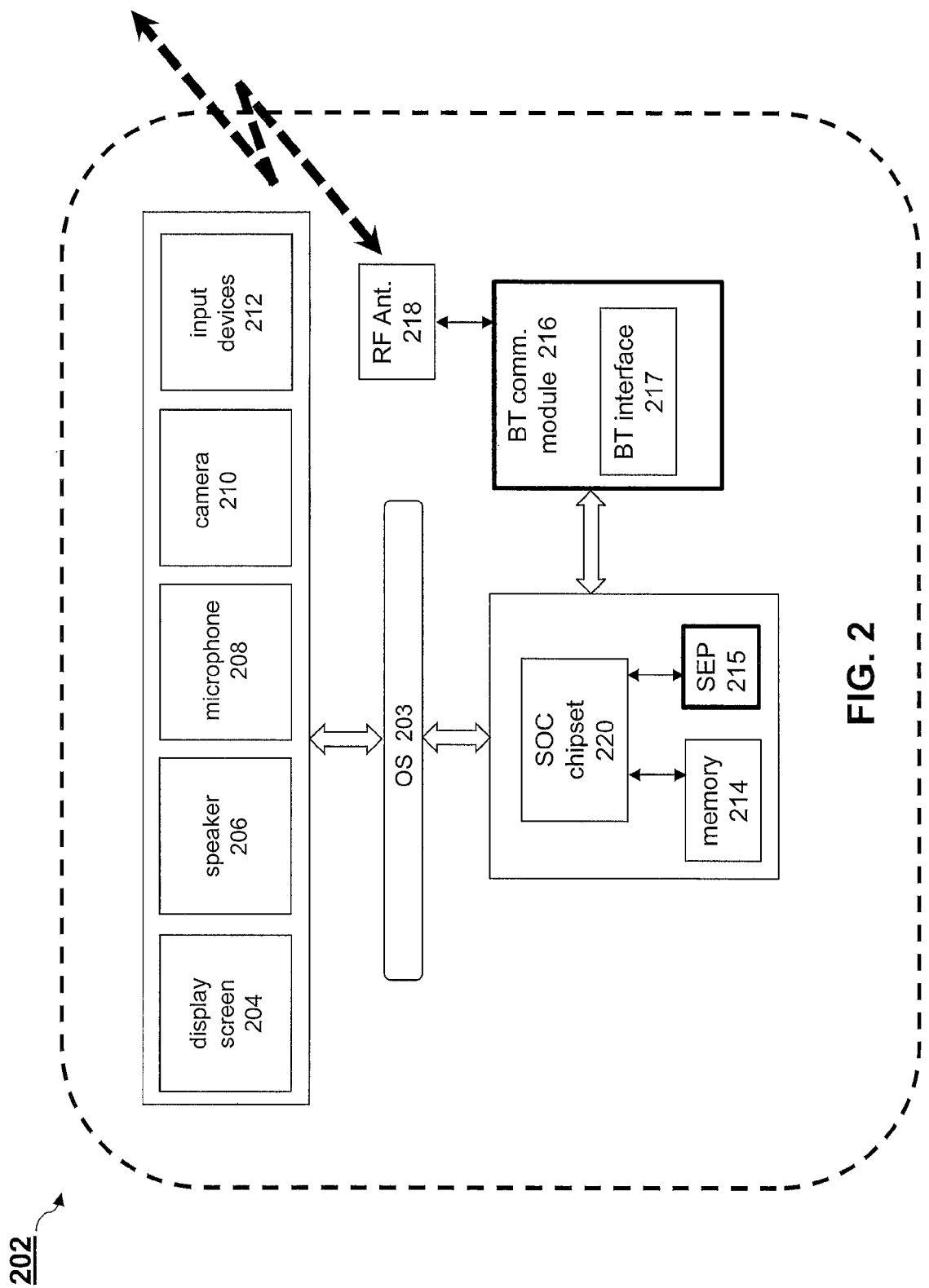
FIG. 2 depicts a high-level functional block diagram of a wireless communication device, in accordance with various aspects of the present disclosure.

In the non-limiting embodiment depicted by FIG. 1, wireless-enabled device 102 and wireless communication device 202 communicate over a wireless secure BlueTooth channel established by BlueTooth communication modules 116, 216 and SEPs 115, 215. To this end, FIG. 2 depicts wireless communication device 202 in greater detail, in accordance with various aspects of the present disclosure. In the illustrative example, wireless communication device 202 includes a variety of peripherals, such as, for example, display screen 204, speaker 206, microphone 208, camera 210, input devices 212, as well as memory 214, a SEP 215, BT communication module 216, antenna 218, and a system-on-chip (SoC) chipset 220. The wireless communication device 202 may also include a bus infrastructure and/or other interconnection means to connect and communicate information between the various components of device 202.

In some embodiments, SoC 220 may be part of a core processing or computing unit of wireless communication device 202, and is configured to receive and process input data and instructions, provide output and/or control other components of device 202 in accordance with embodiments of the present disclosure. SoC 220 may include a microprocessor, a memory controller, a memory and other components. The microprocessor may further include a cache memory (e.g., SRAM), which along with the memory of SoC 220 may be part of a memory hierarchy to store instructions and data. The microprocessor may also include one or more logic modules such as a field programmable gate array (FPGA) or other logic array. Communication between the SoC 220's microprocessor and memory may be facilitated by the memory controller (or chipset), which may also facilitate communication with the peripheral components.

Memory 214 of wireless communication device 202 may be a dynamic storage device coupled to the bus infrastructure and configured to store information, instructions, and programs to be executed by processors of SoC 220 and/or other processors (or controllers) associated with device 202. Some of all of memory 214 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Wireless communication device 202 may also include read only memory (ROM) and/or other static storage devices coupled to the bus infrastructure and configured to store static information and instructions for processors of SoC 220 and/or other processors (or controllers) associated with device 202.

SEP 215 comprises a security chipset that stores computer-generated keys for encryption. SEP chipset 215 may be coupled to associated processors, via the bus infrastructure, or may alternatively be integrated into SoC 220. SEP chipset 215 operates to prevent the hacking or snooping of key entries, passwords, encryption keys, and other sensitive data. As such, SEP chipset 215 may comprise core root of trust measurement (CRTM) module, encryptor module, decryptor module, key generator, a random number generator (RNG), hash engine, secure storage (e.g., tamper-resistant flash memory), and platform configuration registers (PCRs). In some embodiments, the SEP chipset 215 incorporates an internal secure operation system with associated security applications that are configured under certain industry standards/specifications, such as, for example, GlobalPlatform. Such industry-based security standards provide proven encryption mechanisms as well as algorithms allowing the establishment of secure communication links using those encryption mechanisms, such as, for example, Secure Channel Protocol (SCP) 02, SCP03, SCP10, etc.

BT communication module 216 includes BT interface 217 which comprises transceiver, transponder, modulation/demodulation, and memory circuitry, configured to wirelessly communicate and transmit/receive information as well as establishing a BlueTooth communication link via RF antenna 218. BT communication module 216 may be configured to communicate with SEP chipset 215, via the bus infrastructure.

While SEP chipset 215 and BT communication module 216 have been described relative to wireless communication device 202, it will be appreciated that SEP chipset 115 and BT communication module 116 of wireless-enabled device 102 may be similarly configured. Thus, for the sake of brevity, SEP chipset 115 and BT communication module 116 will not be individually described, relying instead on the similar descriptions of SEP chipset 215 and BT communication module 216 disclosed above.

As noted above, BT communication modules 116, 216 may be configured to communicate with SEP chipsets 115, 215, via their respective bus infrastructures. Given such a configuration, BlueTooth communications between wireless-enabled device 102 and wireless communication device 202 may be protected and secured by routing the corresponding serial communications through SEP chipsets 115, 215, respectively, as indicated in FIG. 1.

In particular, as wireless communication device 202 comes into range with wireless-enabled device 102, wireless communication device 202 may scan a predefined set of frequencies to sense the existence of wireless-enabled device 102. Upon acknowledgement of wireless-enabled device 102, BT communication module 216 performs a series of message exchanges and communicates with BT communication module 116 to establish a BlueTooth communication link.

The establishment of the BlueTooth communication link triggers SEP 215 of wireless communication device 202 to initiate procedures to secure the BlueTooth link. For example, SEP 215 may generate transactional messages directed to SEP 115 of wireless-enabled device 102 which are forwarded by BT communication module 216 and across the BlueTooth link. The transactional messages may request security-related information, such as, for example, identification data, SE configuration data, SE operating system/security application data, authentication data, security/encryption key establishment data, etc. After receiving the messages, SEP 115 of wireless-enabled device 102 generates response messages and forwards the responses through BT communication module 116 and across the BlueTooth link.

Upon evaluating the suitability and/or compatibility of the security-related information of both SEP chipsets 115, 215, the chipsets 115, 215 establish a secure channel, such as, for example, SCP 02, SCP03, SCP10, etc., across the BlueTooth communication link. Once the secure channel is established, the corresponding serial communication data exchanged between wireless-enabled device 102 and wireless communication device 202 is routed through BT communication modules 116, 216 and onto SEP chipsets 115, 215 prior to being forwarded to the respective operating systems.

For example, as indicated in FIG. 1, the communication data received by wireless communication device 202 is first processed by BT communication module 216 and then routed to and processed by SEP chipset 215 which, in turn, forwards the secured data to operating system 203. Alternatively or in addition to, should additional security be desired, the secured data from SEP chipset 215 may be further encrypted prior to being forwarded to operating system 203.

By virtue of the disclosed configurations and processes, Bluetooth communications may be safely and effectively routed directly from the Bluetooth communication module chipset into the Secure Element (SE) of cellular-based communication device (e.g., smartphone) before entering the communication device's operating system (OS). Thus, these configurations and processes significantly reduce the susceptibility and vulnerability of communication devices to malware attacks.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary aspects of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of method, processing elements, or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A wireless communication device, comprising:
   a processor;
   an operating system executed by the processor;
   a wireless communication module comprising hardware configured to execute instructions to establish a wireless communication link and facilitate transmission and reception of wireless data via the wireless communication link; and
   a secure element comprising a hardware platform configured to establish a secure channel related to the wireless communication link, wherein the secure element is triggered to establish the secure channel responsive to the establishment of the wireless communication link by the wireless communication module,
   wherein, in operation, upon establishment of the wireless communication link and the secure channel, the wireless communication module executes instructions to route the wireless data received at the wireless communication module to the secure element for processing, and the secure element is configured to operate in accordance with a Secure Channel Protocol and encrypt the wireless data received from the wireless communication module prior to forwarding the wireless data to the operating system,
   wherein the secure element is to request security-related information including one or more of the following: identification data, secure element configuration data, secure element operating system/security application data, authentication data, and security/encryption key establishment data.

2. The wireless communication device of claim 1, wherein the secure element is communicatively coupled to the wireless communication module.

3. The wireless communication device of claim 1, wherein the secure element includes one or more of the following: core root of trust measurement module, encryptor module, decryptor module, key generator, a random number generator, hash engine, secure storage, and platform configuration registers.

4. The wireless communication device of claim 1, wherein the wireless communication link comprises a communication link based on a standard for a wireless personal area network.

5. The wireless communication device of claim 1, wherein the secure element operates in accordance with a GlobalPlatform standard.

6. A wireless communication system, comprising:
   an electronic device including:
   a first wireless communication module comprising hardware configured to execute instructions to facilitate transmission and reception of wireless data via a wireless communication link; and
   a first secure element comprising a first hardware platform; and
   a wireless communication device including:
   a processor;

an operating system executed by the processor;
a second wireless communication module comprising hardware configured to execute instructions to establish the wireless communication link and facilitate transmission and reception of wireless data via the wireless communication link; and
a second secure element comprising a second hardware platform, wherein, the second secure element is configured to exchange information with the first secure element via the wireless communication link to establish a secure channel related to the wireless communication link, wherein the second secure element is triggered to establish the secure channel responsive to the establishment of the wireless communication link by the second wireless communication module, and
wherein, in operation, upon establishment of the wireless communication link and the secure channel, the second wireless communication module executes instructions to route the wireless data received at the second wireless communication module to the second secure element for processing, and the second secure element is configured to operate in accordance with a Secure Channel Protocol and encrypt the wireless data received from the second wireless communication module prior to forwarding the wireless data to the operating system,
wherein the first and second secure elements are to exchange security-related information including one or more of the following: identification data, secure element configuration data, secure element operating system/security application data, authentication data, and security/encryption key establishment data.

7. The wireless system of claim 6, wherein the first and second secure elements are communicatively coupled to the first and second wireless communication modules, respectively.

8. The wireless system of claim 6, wherein the first and second secure elements include one or more of the following: core root of trust measurement module, encryptor module, decryptor module, key generator, a random number generator, hash engine, secure storage, and platform configuration registers.

9. The wireless system of claim 6, wherein the wireless communication link comprises a communication link based on a standard for a wireless personal area network.

10. The wireless system of claim 6, wherein the first and second secure elements operate in accordance with a GlobalPlatform standard.

11. A method, comprising:
establishing, a wireless communication module comprising hardware, a wireless communication link to facilitate transmission and reception of wireless data via the wireless communication link;
establishing, using a secure element comprising hardware, a secure channel related to the wireless communication link responsive to the establishment of the wireless communication link, wherein the secure element is configured to operate in accordance with a Secure Channel Protocol;
routing wireless data received via the wireless communication link from the wireless communication module to the secure element for processing; and
encrypting, at the secure element, the wireless data prior to forwarding the wireless data to an operating system executing in a device,
wherein the secure element is to request security-related information including one or more of the following: identification data, secure element configuration data, secure element operating system/security application data, authentication data, and security/encryption key establishment data.

12. The method of claim 11, wherein the secure element includes one or more of the following: core root of trust measurement module, encryptor module, decryptor module, key generator, a random number generator, hash engine, secure storage, and platform configuration registers.

13. The method of claim 11, wherein the establishing a wireless communication link is based on a standard for a wireless personal area network.

14. The method of claim 11, wherein the secure element is to operate in accordance with a GlobalPlatform standard.

* * * * *